United States Patent [19]

Macey et al.

[11] 3,714,397

[45] Jan. 30, 1973

[54] INFORMATION PROCESSING SYSTEM

[75] Inventors: Frank G. Macey, Shrewsbury; Robert H. Reif, Groton, both of Mass.

[73] Assignees: GTE Information Systems; Sylvania Electric Products Inc.

[22] Filed: Nov. 12, 1970

[21] Appl. No.: 88,935

[52] U.S. Cl.......................235/61.11 E, 250/219 CR 340/146.3 K, 340/146.3 AH

[51] Int. Cl..............................................G06k 7/12

[58] Field of Search....340/146.3 K, 146.3 AH, 146.3 AG; 235/61.11 E; 250/203, 219 CR, 219 D, 219 DC, 223

[56] References Cited

UNITED STATES PATENTS

| | | | |
|---|---|---|---|
| 3,456,997 | 7/1969 | Stites | 235/61.11 E |
| 3,568,151 | 3/1971 | Majima | 250/219 CR |
| 3,486,024 | 12/1969 | Astheimer | 250/203 |

*Primary Examiner*—Maynard R. Wilbur

*Assistant Examiner*—Robert F. Gnuse

*Attorney*—Norman J. O'Malley, Elmer J. Nealon and Peter Xiarhos

[57] ABSTRACT

An optical label-reading system including a gain equalizing arrangement and a variable-gain amplifier circuit for equalizing the amplitudes of electrical signals derived by an optical scanning apparatus from coded retroreflective labels affixed to railway vehicles at varying vertical heights within a wide range of vertical heights.

15 Claims, 3 Drawing Figures

INVENTORS
FRANK G. MACEY
ROBERT H. REIF

BY Peter Xiarhos

INVENTORS
FRANK G. MACEY
ROBERT H. REIF
BY
Peter Xearkos

INVENTORS
FRANK G. MACEY
ROBERT H. REIF
BY
Peter Xiarhos

INFORMATION PROCESSING SYSTEM

BACKGROUND OF THE INVENTION

The present invention relates to a system for processing information encoded in a label. More particularly, it is concerned with an optical label-reading system including a gain equalizing arrangement and a variable-gain amplifier circuit for equalizing the amplitudes of electrical signals derived from coded labels affixed to vehicles at varying vertical heights within a wide range of vertical heights.

Various systems and apparatus are known for optically reading coded labels affixed to vehicles or to other objects presented to a label-reading station. An exemplary system for reading coded identification labels on railway vehicles, for example, railroad cars, is described in detail in U.S. Pat. 3,225,177 to Stites et al., assigned to the same assignee as the present application. In the above-mentioned patented system, a label is constructed from a plurality of rectangular retroreflective orange, blue, and white stripes, and non-retroreflective black stripes, and affixed in a vertical orientation to the side of a railway vehicle to be identified at a predetermined label-reading station. The various stripes are arranged one above the other in a coded pattern representative of the identity or other information pertaining to the vehicle. As the labeled vehicle passes the label-reading station, the coded data is sensed from the label by means of an optical scanning apparatus which causes a moving incident beam of light to sweep across the side of the vehicle, typically through a vertical scan range of approximately nine feet, and to intercept the label. The light reflected from the various retroreflective code stripes of the label is returned along the path of the incident light to the optical scanning apparatus and converted thereby into electrical signals representative of the information encoded in the label. The electrical signals are then applied to suitable signal processing apparatus for further processing.

The above-described patented system functions in a generally satisfactory manner to read labels affixed to vehicles at varying vertical heights within the aforementioned 9-foot range of heights. However, when a label is affixed to a vehicle at a vertical height so as to be scanned either below or above the center position of the sweep of an incident scanning beam, each of which situations commonly occurs in actual practice due to label placement restrictions imposed by the size, shape, or construction of railway vehicles, the incident light returned to the optical scanning apparatus by the label is attenuated in value from that returned by a label affixed to a vehicle at a height so as to be scanned at the center position of the incident scanning beam. By way of a specific example, when a label is affixed to the lower portion of the side of a standard boxcar or to a flat car carrier, and scanned at the beginning of the sweep of an incident scanning beam (so-called "bottom of scan"), the light returned from the label may be attenuated by as much as six to eight times the light returned from a label positioned on a vehicle so as to be scanned at the center position of the sweep of an incident scanning beam (so-called "center of scan"). Similarly, when a label is affixed to the upper portion of the side of a standard boxcar or to a piggyback vehicle, and scanned at the end of the sweep of an incident scanning beam (so-called "top of scan"), the light returned from the label may similarly be attenuated by as much as six to eight times the light returned from a label positioned on a vehicle so as to be scanned at the center position of the sweep of an incident scanning beam.

The reasons for the abovementioned differences in the light return from labels positioned on vehicles so as to be scanned either below or above the center position of the sweep of an incident scanning beam, as described above, are twofold. First, the path length of light rays directed onto labels positioned on vehicles so as to be scanned either below or above the center position of the sweep of an incident scanning beam is greater than the path length of light rays directed onto a label positioned on a vehicle so as to be scanned at the center position of the sweep of an incident scanning beam. Secondly, and more importantly, the retroreflective material of which the labels are constructed causes a reduced return when scanned with light rays forming large angles of incidence with respect to horizontal planes normal to the labels, for example, angles of incidence greater than 12°–15°. The effect of the abovementioned differences in the amount of attenuation of incident light produced by labels positioned at different heights on vehicles is to cause output signals of widely varying amplitude to be produced by the optical scanning apparatus and to be applied to the signal processing apparatus. Although the signal processing apparatus is capable of processing these signals, the processing of these signals by the signal processing apparatus would nonetheless be simplified, and the possibility of error reduced, if the signals were of an essentially uniform, constant amplitude. It is a principal object of the present invention, therefore, to provide an optical label-reading system for reading labels wherein signals derived from the labels have an essentially uniform, constant amplitude.

BRIEF SUMMARY OF THE INVENTION

Briefly, in accordance with the present invention, a system is provided for processing information encoded in labels which may be presented to a label-reading unit from within a wide range of vertical heights. In accordance with the present invention, an information-sensing means is provided which has a predetermined vertical operating range associated therewith. The information-sensing means is adapted to sense information encoded in a label when the label is present within the predetermined vertical operating range associated therewith and to produce output signals representative of the information encoded in the label. Output signals produced by the information-sensing means and representative of information encoded in a label present within the predetermined vertical operating range associated therewith are received by means in accordance with the invention and amplified thereby by an amount related to the vertical position of the label within the predetermined vertical operating range associated with the information-sensing means.

As will become fully apparent hereinafter, the amount of amplification of output signals produced by the information-sensing means and representative of information encoded in labels located at varying positions within the vertical operating range associated with the information-sensing means may be controlled, in a varying fashion, to provide amplified output signals having an essentially uniform, constant amplitude.

BRIEF DESCRIPTION OF THE DRAWING

The invention is more fully described in the following detailed description, taken in conjunction with the accompanying drawing in which.

GENERAL DESCRIPTION - FIG. 1

Figure 1:
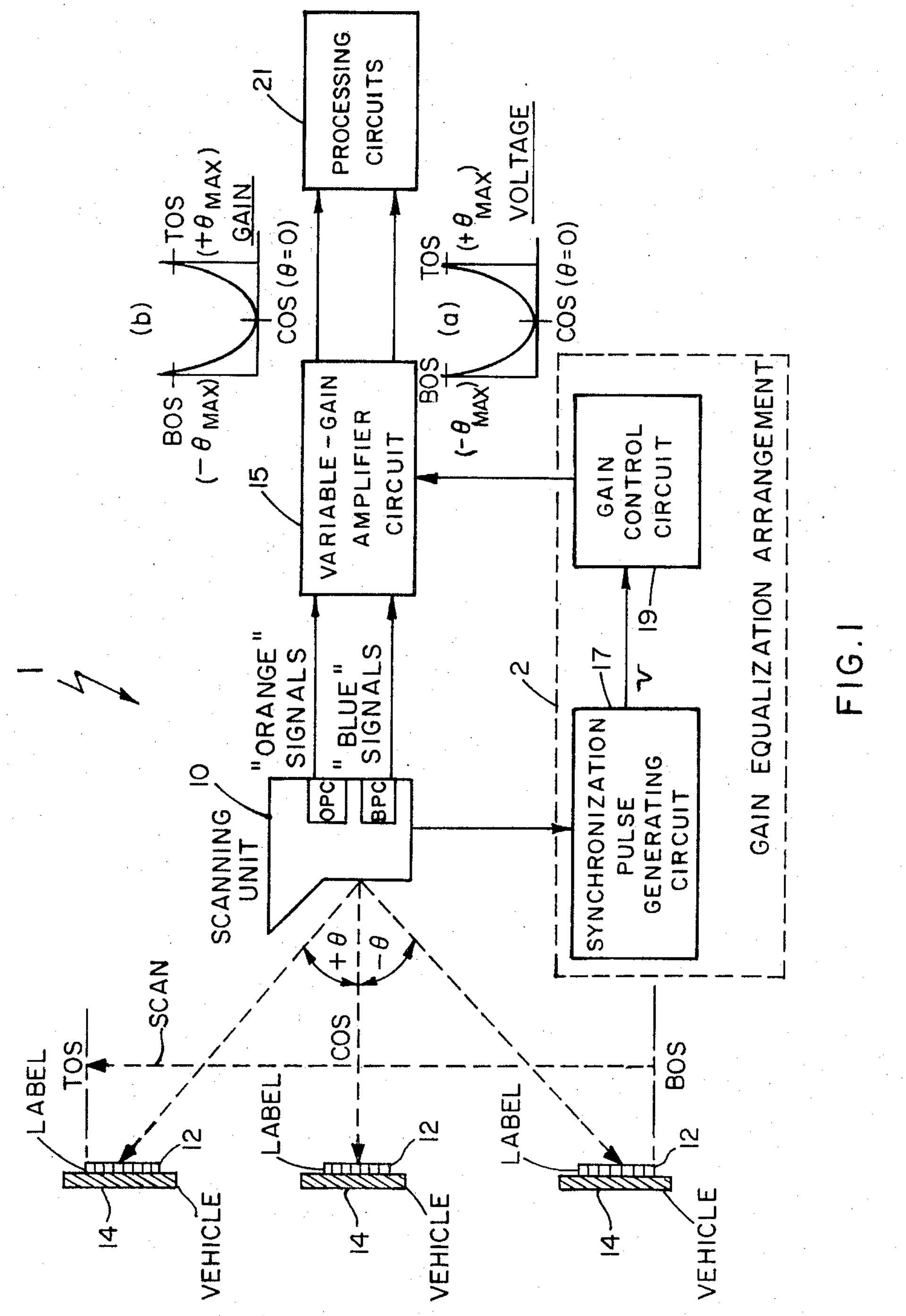
FIG. 1 is a diagrammatic representation in block diagram form of an optical label reading system including a gain equalizing arrangement and a variable-gain amplifier circuit in accordance with the present invention.

Referring to FIG. 1, there is shown in block diagram form an optical label reading system 1 in accordance with the present invention. As shown in FIG. 1, the optical label reading system 1 includes a scanning unit 10 for vertically sweeping an incident scanning light beam across a coded label 12 affixed to the side of a vehicle 14 presented to the scanning unit 10. Typically, the vehicle 14 is approximately 9 to 12 feet away from the scanning unit 10. As indicated in FIG. 1, the label 12 may be positioned on a vehicle 14 anywhere within the lowermost and uppermost positions, designated BOS ("bottom of scan") and TOS ("top of scan"), respectively, of the incident scanning beam produced by the scanning unit 10. A typical value of the vertical distance between the lowermost and uppermost positions of the incident scanning beam produced by the scanning unit 10, that is, the vertical scanning or operating range of the scanning unit 10, is 9 feet, a value sufficient to enable the reading of labels affixed to all existing types of railway vehicles including the aforementioned boxcars, flat car carriers, and piggyback vehicles.

Although the coded label 12 may assume a variety of different forms, an exemplary and preferred form of the coded label 12 is described in detail in the aforementioned patent to Stites et al and includes a plurality of orange, blue, and white retroreflective stripes, and black non-retroreflective stripes, arranged in selected two-stripe code combinations to represent the identity of other information pertaining to the vehicle 14.

Light reflected from the various stripes of a label 12 in response to being scanned by the incident scanning beam produced by the scanning unit 10 is returned to and received by the scanning unit 10 and selectively converted thereby into coded electrical output signals representative of the information encoded in the label 12. More particularly, an " orange-responsive" photocell OPC is provided in the scanning unit 10 for producing an electrical output signal ("ORANGE" signal) in response to light reflected from either an orange stripe or a white stripe of the label 12 (white reflected light including an "orange" component), and "blue-responsive" photocell BPC is provided in the scanning unit 10 for producing an electrical output signal ("BLUE" signal) in response to light reflected from either a blue stripe or a white stripe of the label 12 (white reflected light including a "blue" component). Thus, both photocells OPC and BPC are energized simultaneously to produce respective electrical output signals in response to light reflected from a white stripe. Neither of the photocells OPC and BPC is energized to produce an electrical output signal when a black stripe is scanned inasmuch, as previously stated, the black stripes are non-retroreflective.

For reasons discussed previously in the section entitled "Background of the Invention", the amplitude of the various electrical output signals produced by the scanning unit 10 is a function of the vertical position of the label within the vertical scan range of the scanning unit 10 or, as shown in FIG. 1, a function of the angle $-\theta$ or $+\theta$ at which the label is scanned. Thus, for a label 12 positioned on a vehicle 14 so as to be scanned at the center position (COS) of the scanning beam produced by the scanning unit 10, in which case the angle $\theta$ has a value of 0°, the scanning unit 10 produces coded electrical output signals of a maximum amplitude; for a label 12 positioned on a vehicle 14 at a height so as to be scanned between the lowermost position (BOS) and the center position (COS) of the scanning beam, or between the center position and the uppermost position (TOS) of the scanning beam, the scanning unit 10 produces coded electrical output signals having an amplitude less than the aforementioned maximum amplitude by an amount which increases with increases in the value of the angle $-\theta$ or $+\theta$ at which the label is scanned.

The various coded electrical output signals ("ORANGE" and "BLUE" signals) produced by the photocells OPC and BPC provided in the scanning unit 10 as a result of scanning a given coded label 12 are applied to a variable-gain amplifier circuit 15. The variable-gain amplifier circuit 15 operates, under control of a gain equalizing arrangement 2, to amplify the various signals received thereby by an amount which depends on the value of the scan angle $-\theta$ or $+\theta$ associated therewith, the amount of amplification being at a minimum for $\theta=0°$ and at a maximum for $\theta=\pm\theta_{max}$ and increasingly varying between $\theta=0°$ and $\theta=\pm\theta_{max}$. The above operation of the variable-gain amplifier circuit 15 is initiated by the gain equalizing arrangement 2 which comprises a synchronization pulse generating circuit 17 coupled to the scanning unit 10 and a gain control circuit 19 coupled to the synchronization pulse generating circuit 17 and to the variable-gain amplifier circuit 15. More specifically, the synchronization pulse generating circuit 17 operates at the outset of each sweep of a scanning beam produced by the scanning unit 10 to generate a synchronization pulse which is applied to the gain control circuit 19. The gain control circuit 19 operates in response to the synchronization pulse to produce an amplitude-varying output control voltage, as shown at (a) in FIG. 1, concurrent with the sweeping action of the scanning beam produced by the scanning unit 10. As indicated at (a) in FIG. 1, the amplitude-varying output control voltage has a value which decreases progressively in an exponential fashion from a maximum value to a minimum value as the scanning beam moves from its lowermost position (BOS) to its center position (COS), and which then increases progressively in an exponential fashion from its minimum value back to its maximum value as the scanning beam moves from its center position to its uppermost position (TOS).

Figure 3:
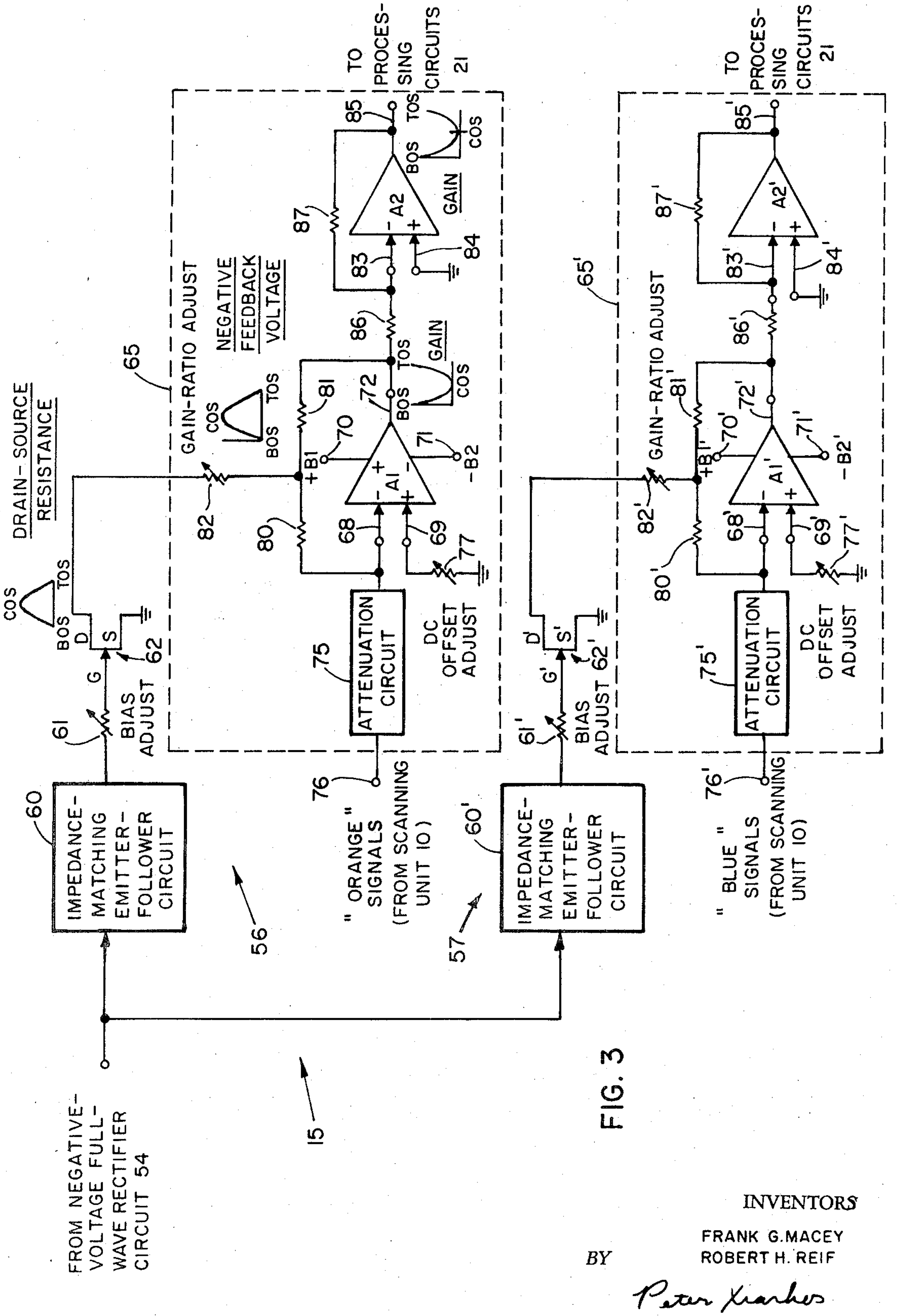
FIG. 3 is a detailed diagrammatic representation of a preferred form of the variable-gain amplifier circuit.

As the abovementioned amplitude-varying output control voltage is produced by the gain control circuit 19, the variable-gain amplifier circuit 15, a suitable and preferred implementation of which is shown in FIG. 3, to be described in detail hereinafter, operates in response to the amplitude-varying output control voltage to vary the value of its gain over the duration of the sweep of the scanning beam produced by the scanning unit 10. As shown at (b) in FIG. 1, the gain of the variable-gain amplifier circuit 15 decreases progressively in an exponential fashion from a maximum value to a minimum value as the scanning beam moves from its lowermost position (BOS) to its center position (COS), and then increases progressively in an exponential fashion from its minimum value back to its maximum value as the scanning beam moves from its center position to its uppermost position (TOS).

As will be readily apparent hereinafter, due to the nearly linear nature of the gain characteristic of the variable-gain amplifier circuit 15 between the "BOS" and "COS" points and between the "COS" and "TOS" points, the output signals produced by the variable-gain amplifier circuit 15 during the reading of labels presented to the scanning unit 10 are caused to have essentially uniform, constant amplitude, irrespective of variations in the height of the labels presented to the scanning unit 10. The output signals produced by the variable-gain amplifier circuit 15 are applied to processing circuits 21 for further processing thereby. Typically, the processing circuits 21 include signal normalizing circuits, logic and decoding circuits, and readout circuits as are well understood by those skilled in the art.

Figure 2:
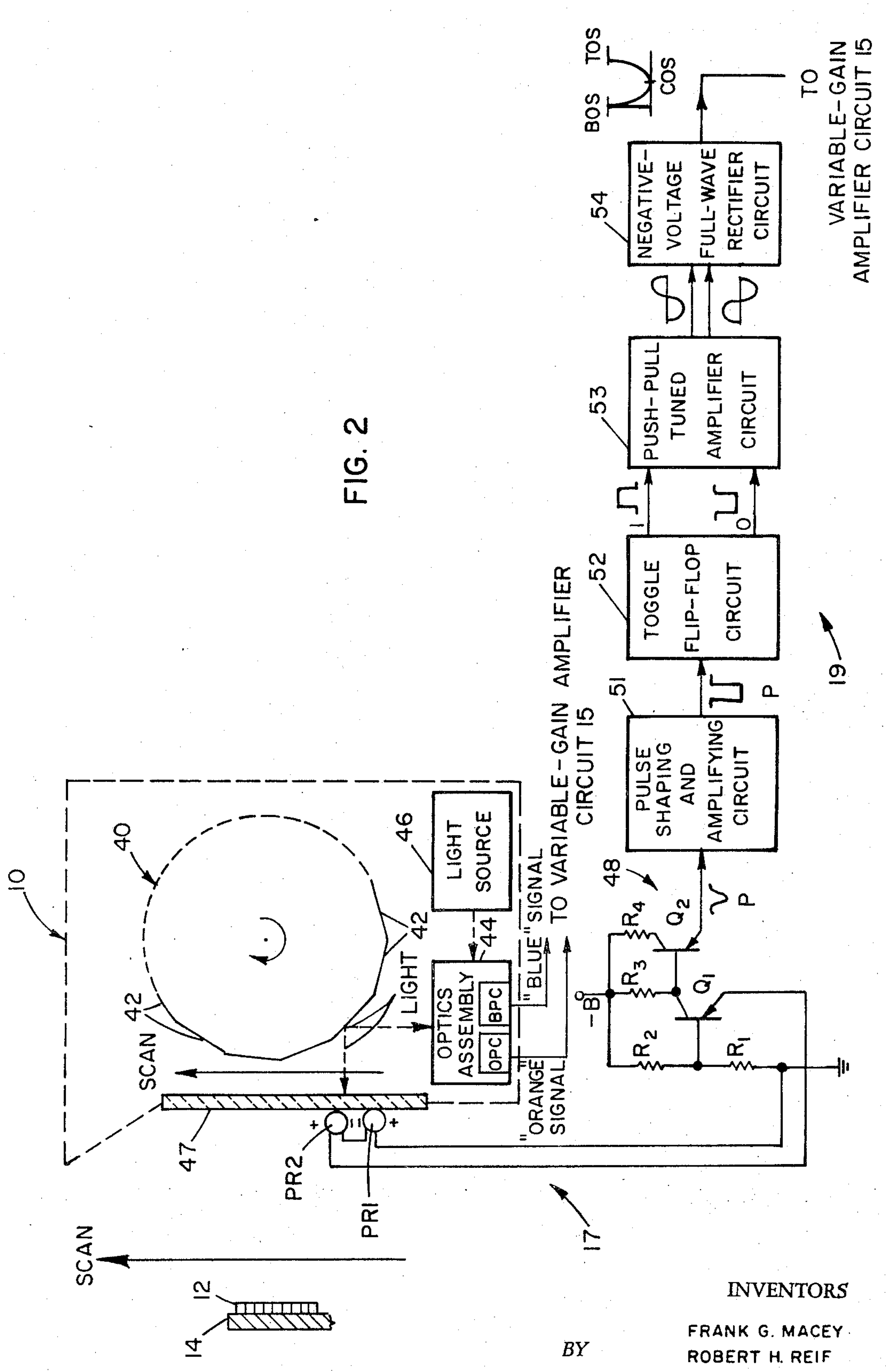
FIG. 2 is a detailed diagrammatic representation of a scanning unit which may be employed in the optical label reading system of FIG. 1 and also of a synchronization pulse generating circuit and a gain control circuit employed in the gain equalizing arrangement in accordance with the present invention.

Scanning Unit, Gain Equalizing Arrangement – FIG. 2

Referring now to FIG. 2, there is shown a suitable implementation of the scanning unit 10, the synchronization pulse generating circuit 17, and the gain control circuit 19.

The scanning unit 10 is preferably of a type such as described in detail in the aforementioned patent to Stites et al and includes a rotating wheel 40 having a plurality of reflective mirror surfaces 42 on its periphery, an optics assembly 44 including the aforementioned "orange-responsive" photocell OPC and the "blue-responsive" photocell BPC, and a light source 46. By way of example, the rotating wheel 40 may be 14 inches in diameter, have 15 reflective mirror surfaces 42 on its periphery, and rotate at 1,200 revolutions per minute.

The synchronization pulse generating circuit 17 includes a pair of series-connected photo responsive devices PR1 and PR2 positioned on a transparent glass or plastic plate 47 associated with the scanning unit 10, and a light detector circuit 48 connected with the photoresponsive devices PR1 and PR2. The photoresponsive devices PR1 and PR2 are positioned on the plate 47 so as to be illuminated at the outset of each scanning beam produced by the scanning unit 10. The two photoresponsive devices PR1 and PR2, which may be solar cells, are connected together and the positive terminals being connected to the light detector circuit 48. As indicated in FIG. 2, the positive terminal of the photoresponsive device PR1 is connected directly to ground potential, and the positive terminal of the photoresponsive device PR2 is directly connected to the emitter of pnp switching transistor $Q_1$. The base of the switching transistor $Q_1$ is connected to the juncture of a pair of voltage divider resistors $R_1$ and $R_2$ which are connected between a negative voltage source $-B$ and ground potential. The collector of the switching transistor $Q_1$ is coupled to the negative voltage source $-B$ via a resistor $R_3$ and also directly to the base of a pnp output transistor $Q_2$ which is arranged in an emitter-follower configuration. The collector of the transistor $Q_2$ is coupled to the negative voltage source $-B$ via a current-limiting resistor $R_4$.

The gain control circuit 19 comprises, in series with the emitter of the pnp emitter-follower transistor $Q_2$, a pulse shaping and amplifying circuit 51, a toggle flip-flop circuit 52, a push-pull tuned amplifier circuit 53, and a negative-voltage full-wave rectifier circuit 54. The operation of the scanning unit 10, the synchronization pulse generating circuit 17, and the gain control circuit 19 of FIG. 2 is as follows.

As a vehicle 14 bearing a coded label 12 is presented to the scanning unit 10, light from the light source 46 is initially directed by the optics assembly 44 onto the reflective mirror surfaces 42 of the rotating wheel 40. When a rotation motion is imparted to the rotating wheel 40 (as by a motor, not shown), the light received by the reflective mirror surfaces 42 is directed through the transparent plastic or glass plate 47 onto the label 12. The light directed onto the label 12 is retroreflected by each of the retroreflective stripes of the label 12, as they are successively scanned, along the path of the incident light. The retroreflected light is returned by each retroreflective stripe onto the reflective mirror surfaces 42 of the rotating wheel 40 and then to the optics assembly 44. In the optics assembly 44, the return light is separated into its "orange" and "blue" components and selectively applied to the orange-responsive and blue-responsive photocells OPC and BPC. As mentioned previously, in response to an orange stripe being scanned, the orange-responsive photocell OPC is operated to produce an electrical output signal ('-'ORANGE" signal), and in response to a blue stripe being scanned, the blue-response photocell BPC is operated to produce an electrical output signal ("-BLUE" signal). In response to a white stripe being scanned, both of the photocells OPC and BPC are operated to produce respective electrical output signals, and in response to a black non-retroreflective stripe being scanned, neither of the photocells OPC and BPC is operated to produce an output signal. The various electrical output signals selectively produced by the photocells OPC and BPC are applied to the variable-gain amplifier circuit 15 (FIG. 1).

The scanning unit 10 of FIG. 2 has been described hereinabove to the extent believed necessary to understand the present invention. However, for further or more specific details relating to the components of the scanning unit 10 and their operation, reference may be made to the aforementioned patent to Stites et al. Reference may also be made to the patent to Stites et al. for additional or more specific details as to the coded retroreflective label 12.

As the abovedescribed label scanning operation is initiated and, more particularly, at the outset of the scanning beam produced by the scanning unit 10, both of the photoresponsive devices PR1 and PR2 are briefly illuminated in succession by light from one of the reflective mirror surfaces 42 of the rotating wheel 40. As the first photoresponsive device PR1 alone is illuminated, as the scanning beam instantaneously sweeps past the first photoresponsive device PR1, a negative voltage is produced thereacross (that is, the photoresponsive device PR1 acts like a negative battery source), and the potential at the emitter of the pnp switching transistor $Q_1$ becomes sufficiently negative with respect to the base to cause the transistor $Q_1$ to operate in its non-conducting condition. The base-emitter potential of the pnp emitter-follower transistor $Q_2$ accordingly becomes sufficiently negative to be forward-biased into its conducting condition. As a result, a synchronization pulse P is initiated at the emitter of the emitter-follower transistor $Q_2$. As the light from the reflective mirror surface continues to move past the first and second photoresponsive devices PR1 and PR2, such that both of the photoresponsive devices PR1 and PR2 are now simultaneously illuminated, opposing voltages are produced across the photoresponsive devices PR1 and PR2 (that is, both of the photoresponsive devices PR1 and PR2 act as opposing negative and positive battery sources, respectively) and the opposing voltages cancel out each other. As a result, the transistor $Q_1$ is operated in its conducting condition and the transistor $Q_2$ is operated in its non-conducting condition, and the synchronization pulse P at the emitter of the emitter-follower transistor $Q_2$ is terminated. As the light from the reflective mirror surface moves away from the first photoresponsive device PR1, such that only the second photoresponsive device PR2 is now illuminated, a positive voltage is developed across the photoresponsive device PR2. However, this positive voltage serves only to render the voltage at the emitter of the transistor $Q_1$ more positive with respect to the base and to keep the transistor $Q_1$ in its conducting condition.

The synchronization pulse P produced by the light detector circuit 48 is applied to the pulse shaping and amplifying circuit 51 and processed thereby in a conventional fashion to achieve sharp leading and trailing edges for the synchronization pulse P and also to achieve the required voltage levels for operating the toggle flip-flop circuit 52. The toggle flip-flop circuit 52, of well-known construction, operates in response to the synchronization pulse P, after being processed by the pulse shaping and amplifying circuit 51, to be placed in a first operating state during which the voltage level at each of a pair of output terminals thereof (designated "1" and "0") changes from a first value to a second value, the changes occurring at the output terminals of the toggle flip-flop circuit 52 being in opposite directions. During the next succeeding scanning operation, the toggle flip-flop circuit 52 is "toggled" to its second operating state during which the voltage at each of the output terminals thereof is returned from its second value back to its first value. Thus, the toggle flip-flop circuit 52 is alternately toggled between its two operating states by successive synchronization pulses P derived during successive scanning operations.

The push-pull tuned amplifier circuit 53, also of known construction (for example, a Class C push-pull tuned amplifier circuit), operates in response to each voltage transition occurring at each of the output terminals of the toggle flip-flop circuit 52 to produce a corresponding half cycle of a sinusoidal voltage, the output of the push-pull tuned amplifier circuit 53 for two successive voltage transitions being a fully cycle of a sinusoidal voltage. Since the voltage transitions occuring at the output terminals of the flip-flop circuit 52 are in opposite directions, the sinusoidal voltages produced by the push-pull tuned amplifier circuit 53 are of opposite phase, as shown in FIG. 2. Each full sinusoid of voltage produced by the push-pull tuned amplifier circuit 53 is applied to the negative-voltage full-wave rectifier circuit 54 and full-wave rectified thereby to produce a negative half-cycle of voltage synchronized with a sweep of the scanning beam produced by the scanning unit 10. As indicated in FIG. 2, the negative half-cycle of voltage produced by the negative-voltage full-wave rectifier circuit 54 has a value which decreases progressively in an exponential fashion from a maximum value to a minimum value as the scanning beam moves from its lowermost position (BOS) to its center position (COS), and which then increases progressively in an exponential fashion from its minimum value back to its maximum value as the scanning beam moves from its center position to its uppermost position (TOS). The amplitude-varying negative half-cycle of voltage produced by the negative-voltage full-wave rectifier circuit 54 is applied to the variable-gain amplifier circuit 15 (FIG. 1).

Variable-Gain Amplifier Circuit 15 – FIG. 3

Although the variable-gain amplifier circuit 15 may assume a variety of forms well known to those skilled in the art, a particularly suitable and preferred form of the variable-gain amplifier circuit 15 is show in FIG. 3. As shown in FIG. 3, the variable-gain amplifier circuit 15 includes a first amplifying arrangement 56 for processing "ORANGE" signals produced by the scanning unit 10 as a result of scanning orange and white stripes of a label 12, and a second amplifying arrangement 57 for processing "BLUE" signals produced by the scanning unit 10 as a result of scanning blue and white stripes of a label 12. Since the first and second amplifying arrangements 56 and 57 are of the same construction and operate in the same manner, only the first amplifying arrangement 56 will be described in detail herein. For this reason, primed reference numerals are employed in FIG. 3 to identify the various elements comprising the second amplifying arrangement 57.

The amplifying arrangement 56 comprises, as shown in FIG. 3: an impedance-matching emitter-follower circuit 60; a variable bias adjust resistor 61 connected in series with the impedance-matching emitter-follower circuit 60; an n-type field effect transistor 62 having a gate electrode G connected in series with the bias adjust resistor 61, a source electrode S connected directly to ground potential, and a drain electrode D; and an operational amplifier circuit 65 connected to the drain electrode D of the field effect transistor 62.

The operational amplifier circuit 65 includes a pair of linear differential amplifiers A1 and A2. The linear differential amplifier A1, which may be one of several well-known commercially-available operational amplifiers, includes, in a conventional fashion, an inverting input terminal 68, a non-inverting input terminal 69, a positive bias terminal 70, a negative bias terminal 71, and an output terminal 72. The inverting input terminal 68 of the linear differential amplifier A1 is coupled to an attenuation circuit 75 which is arranged to receive at an input terminal 75 associated therewith "ORANGE" output signals produced by the scanning unit 10 (FIG. 2). The purpose of the attenuation circuit 75 is to attenuate the "ORANGE" signals, having a typical value of several volts, to less than one volt, this value preventing large-valved output voltages from being produced at and coupled from the output terminal 72 of the linear differential amplifier A1 to the drain electrode D of the field effect transistor 62 and causing undesirable non-linear operation thereof.

The non-inverting input terminal 69 of the linear differential amplifier A1 is coupled to a variable dc offset adjust resistor 77 which is adjusted to prevent any dc voltage which may be present in signals applied by the attenuation circuit 75 to the inverting input terminal 68 of the linear differential amplifier A1 from appearing at the output terminal 72 and adversely affecting the operation of the linear differential amplifier A2. The positive bias terminal 70 of the linear differential amplifier A1 is connected to a positive dc voltage source +B1, and the negative bias terminal 71 is connected to a negative dc voltage source −B2. In addition to the above circuit connections, a pair of series voltage-divider resistors 80 and 81 is connected between the inverting input terminal 68 and the output terminal 72 for establishing a negative-feedback voltage path between the output terminal 72 and the inverting input terminal 68. A variable gain-ratio adjust resistor 82 is also provided between the drain electrode D of the field effect transistor 62 and the juncture of the resistors 80 and 81 for establishing the desired ratio of the minimum value of gain to the maximum value of gain for the linear differential amplifier A1.

The linear differential amplifier A2, which may be of the same type as the linear differential amplifier A1, includes an inverting input terminal 83, a non-inverting input terminal 84, and an output terminal 85. The inverting input terminal 83 of the linear differential amplifier A2 is coupled via a coupling resistor 86 to the output terminal 72 of the linear differential amplifier A1, and the non-inverting input terminal 84 is connected directly to ground potential. A negative feedback resistor 87 is also provided between the inverting input terminal 83 and the output terminal 85 for establishing the desired value of gain for the linear differential amplifier A2.

In the operation of the abovedescribed amplifying arrangement 56, the negative half-cycle of voltage produced by the negative-voltage full-wave rectifier circuit 54 (FIG. 2) during a scanning operation is applied to the impedance-matching emitter-follower circuit 60, and the "ORANGE" signals produced by the scanning unit 10 as a result of scanning a label are applied to the input terminal 76 of the attenuation circuit 75. The time at which the "ORANGE" signals are applied to the attenuation circuit 75 depends on the particular position of the label in the vertical scan range of the scanning unit 10 or, as stated previously, on the particular value of the scan angle $-\theta$ or $+\theta$ associated therewith. The impedance-matching emitter-follower circuit 60 operates in response to the negative half-cycle of voltage received from the negative-voltage full-wave rectifier circuit 54 to couple the negative half-cycle of voltage through the bias adjust resistor 61 to the gate electrode G of the field effect transistor 62. The value of the bias adjust resistor 61 is selected to establish a bias voltage between the gate electrode G and the source electrode S of the field effect transistor 62 which is sufficient to cause the field effect transistor 62 to operate in the linear range of its drain-source resistance operating curve during a label-scanning operation.

The field effect transistor 62 operates in response to the negative half-cycle of voltage applied to its gate electrode G during a scanning operation to increase the value of its drain-source resistance from a minimum value, corresponding to the lowermost position (BOS) of the scanning beam produced by the scanning unit 10, toward a maximum value, corresponding to the center position (COS) of the scanning beam, and back toward its minimum value, corresponding to the uppermost position (TOS) of the scanning beam. As the above resistance variation takes place, the value of the negative feedback voltage of the linear differential amplifier A1 is altered at the juncture of the voltage-divider resistors 80 and 81 in a similar manner to the operation of the field effect transistor 62. That is, as the scanning beam moves between its lowermost position (BOS) and its uppermost position (TOS), the value of the negative feedback voltage at the juncture of the voltage divider resistors 80 and 81 varies from a minimum value, corresponding to the lowermost position (BOS) of the scanning beam produced by the scanning unit 10, to a maximum value, corresponding to the center position (COS) of the scanning beam, and back to its minimum value, corresponding to the uppermost position (TOS) of the scanning beam. As a result of the above operation, the gain of the linear differential amplifier A1 is varied during a scanning operation from a maximum value, corresponding to the lowermost portion (BOS) of the scanning beam produced by the scanning unit 10, to a minimum value, corresponding to the center position (COS) of the scanning beam, and back to its maximum value, corresponding to the uppermost position (TOS) of the scanning beam. Accordingly, the "ORANGE" signals applied to the inverting input terminal 68 of the linear differential amplifier A1, after attenuation by the attenuation circuit 75, are inverted and amplified at the output terminal 72 by an amount directly proportional to the scan angle $-\theta$ or $+\theta$ associated with the label under scan.

The various signals produced at the output terminal 72 of the linear differential amplifier A1 as a result of the above-described operation are coupled via the coupling resistor 86 to the inverting input terminal 83 of the linear differential amplifier A2, inverted and amplified thereby, and applied to the output 85. It is to be noted that inasmuch as the gain characteristic of the linear differential amplifier A1 is nearly linear between its BOS and COS points and also between its COS and TOS points, as indicated in FIG. 3, the amplitudes of all output signals produced by the linear differential amplifier A2, irrespective of variations in the vertical heights of labels presented to the scanning unit 10, are of an essentially uniform, constant value. Accordingly, the processing of the output signals of the linear differential amplifier A2 by the processing circuits 21 is simplified and the possibility of processing errors is reduced.

MODIFICATIONS

Although a vehicle identification system has been disclosed hereinabove for use with retroreflective label coded in a two-position base-four code format, it is to be appreciated that the disclosed system may also be used, with slight modification, with other types of labels and coding formats. For example, for a label of a single color (e.g., white) in which information is encoded by various combinations of stripes of a first width and a second width, the same apparatus as described hereinabove may be employed for processing the various signals derived from such a label however modified to the extent that only one output signal channel of the scanning unit 10 is necessary and only one amplifying arrangement, such as shown at 56 and 57 in FIG. 3, is required in the variable-gain amplifier circuit 15.

It is also to be appreciated that an arrangement other than the specific synchronization pulse generating circuit 17 shown in FIG. 2 may be employed in the present invention. For example, instead of using the specific combination of the photoresponsive devices PR1 and PR2 and the light detector circuit 48, a magnet may be attached to each reflective mirror surface 42 of the rotating wheel 40 (FIG. 2) for operating a field-sensing circuit once during each scan cycle so as to produce a corresponding output pulse. Other changes and modifications will be obvious to those skilled in the art without departing from the invention as set forth in the appended claims.

We claim:

1. A system for processing information relating to an object, comprising:

information-sensing means having a predetermined vertical information-sensing range associated therewith, said information-sensing means being adapted to sense information encoded in a label present within the predetermined vertical information-sensing range associated therewith and to produce output signals representative of the information encoded in the label;

a radiation reflecting label associated with an object and having information encoded therein relating to the object, said label being within the predetermined vertical information-sensing range associated with the information-sensing means;

said information-sensing means being operative to sense the information encoded in the label and to produce output signals representative thereof and comprising scanning means for scanning a beam of electromagnetic radiation through a predetermined vertical scanning range, said beam of electromagnetic radiation intercepting said radiation reflecting label; and receiving means arranged to receive electromagnetic radiation from the radiation-reflecting label and operative in response to electromagnetic radiation received after reflection from the radiation-reflecting label to produce output signals representative of the information encoded in the radiation-reflecting label; and control means operative to receive the output signals produced by the information-sensing means and to amplify said output signals by an amount related to the vertical position of the label within the predetermined vertical information-sensing range associated with the information-sensing means, said control means comprising circuit means coupled to the scanning means and operative during the scanning of the beam of electromagnetic radiation through the predetermined vertical scanning range to produce an output control voltage concurrent with the scanning of the beam of electromagnetic radiation and having an amplitude varying over the duration of the scanning beam of electromagnetic radiation; and variable-gain amplifier circuit means coupled to the receiving means and to the circuit means and having a variable-gain characteristic, said variable-gain amplifier circuit means being adapted to receive the output signals produced by the receiving means representative of the information encoded in the radiation-reflecting label and the amplitude-varying output control voltage produced by the circuit means and operative in response thereto to vary the value of its gain over the duration of the scanning of the beam of electromagnetic radiation through the predetermined vertical scanning range, whereby the output signals produced by the receiving means and representative of the information encoded in the radiation-reflecting label are amplified by the variable-gain amplifier circuit means by an amount dependent on the vertical position of the label within the predetermined vertical scanning range.

2. A system in accordance with claim 1 wherein the radiation-reflecting label comprises a plurality of radiation-reflecting elements arranged in a predetermined code format to represent information.

3. A system in accordance with claim 2 wherein the radiation-reflecting elements are retroreflective elements and the electromagnetic radiation is visible light.

4. A system in accordance with claim 1 wherein:

said circuit means operates during the scanning of the beam of electromagnetic radiation through the predetermined vertical scanning range to produce an output control voltage having an amplitude decreasing from a first value to a second value as the scanning beam moves between a first position and a second position in the predetermined vertical scanning range and then increasing from the second value back to the first value as the scanning beam moves between the second position and a third position in the predetermined vertical scanning range; and said variable-gain amplifier circuit means operates during the scanning of the beam of electromagnetic radiation through the predetermined vertical scanning range to decrease the value of its gain from a first value to a second value as the scanning beam moves between the first position and the second position in the predetermined vertical scanning range and then to increase the value of its gain from the second value back to the first value as the scanning beam moves between the second position and the third position in the predetermined vertical scanning range.

5. A system in accordance with claim 4 wherein:

the first, second, and third positions in the predetermined vertical scan range are the lowermost, center, and uppermost positions, respectively, of the predetermined vertical scanning range, whereby output signals produced by the receiving means and representative of information encoded in labels located at varying positions within the predetermined vertical scanning range are amplified by the variable-gain amplifier circuit means to produce amplified signals therefrom having an essentially uniform, constant value.

6. A system in accordance with claim 1 where in the circuit means comprises:

pulse generating circuit means coupled to the scanning means an operative to generate an output pulse at the outset of the operation of the scanning means to scan the beam of electromagnetic radiation through the predetermined vertical scanning range; and gain control circuit means operative to receive the output pulse generated by the pulse generating circuit means and in response thereto to produce an output control voltage having an amplitude varying over the duration of the scanning of the beam of electromagnetic radiation through the predetermined vertical scanning range.

7. A system in accordance with claim 6 wherein:

the gain control circuit means operates in response to the output pulse produced by the pulse generating circuit means to produce an output control voltage having a value decreasing from a first value to a second value as the scanning beam moves between a first position and a second position in the predetermined vertical scanning range and then increasing from the second value back to the first value as the scanning beam moves between the second position and a third position in the predetermined vertical scanning range; and the variable-gain amplifier circuit means operates during the scanning of the beam of electromagnetic radiation through the predetermined vertical scanning range to decrease the value of its gain from a first value to a second value as the scanning beam moves between the first position and the second position in the predetermined vertical scanning range and then to increase the value of its gain from the second value back to the first value as the scanning beam moves between the second position and a third position in the predetermined vertical scanning range.

8. A system in accordance with claim 7 wherein:

the pulse generating circuit means comprises:

radiation-responsive means positioned with respect to the scanning means so as to be exposed to electromagnetic radiation from the scanning means at the outset of the operation of the scanning means to scan the beam of electromagnetic radiation through the predetermined vertical scanning range; and detector circuit means coupled to the radiation-responsive means and operable in response to the radiation-responsive means being exposed to electromagnetic radiation from the scanning means to produce an output pulse; and the gain control circuit means includes:

first circuit means operative to receive the output pulse produced by the detector circuit means and in response thereto to produce first and second simultaneous output voltage conditions;

push-pull tuned amplifier circuit means operative to receive the first and second output voltage conditions produced by the first circuit means and in response thereto to produce simultaneous positive and negative half-cycles of a sinusoidal voltage;

and negative-voltage full-wave rectifier circuit means operative to receive the positive and negative half-cycles of the sinusoidal voltage produced by the push-pull tuned amplifier circuit means and to full wave rectify said positive and negative half-cycles of the sinusoidal voltage to produce a negative half-cycle of a sinusoidal output voltage, said output voltage representing a control voltage.

9. A system in accordance with claim 8 wherein the radiation-reflecting label comprises a plurality of radiation-reflecting elements arranged in a predetermined code format to represent information.

10. A system in accordance with claim 9 wherein the radiation-reflecting elements are retroreflective elements and the electromagnetic radiation is visible light.

11. A system in accordance with claim 10 wherein the object is a vehicle.

12. A system for processing information encoded in a label, comprising: present scanning unit means adapted to scan through a predetermined range of scan angles and operative in response to scanning a coded label present in the scan path thereof to produce output signals representative of the information encoded in the label; and control means operative to receive output signals produced by the scanning unit means representative of information encoded in a label present in the scan path of the scanning unit means and to amplify the output signals by an amount related to the value of the scan angle at which the label is scanned by the scanning unit means, said control means comprising:

circuit means coupled to the scanning unit means and operative while the scanning unit means scans through the predetermined range of scan angles to produce an output control voltage concurrent with the scan by the scanning unit means and having an amplitude varying over the duration of the scan by the scanning unit means; and variable-gain amplifier circuit means coupled to the scanning unit means and to the circuit means and having a variable-gain characteristic, said variable-gain amplifier circuit means being adapted to receive the output signals produced by the scanning unit means and representative of information encoded in a label and the output control voltage produced by the circuit means and operative in response thereto to vary the value of its gain over the duration of the scan by the scanning unit means, whereby output signals produced by the scanning unit means and representative of information encoded in a label present in the scan path of the scanning unit means are amplified by an amount dependent on the scan angle at which the label is scanned by the scanning unit means.

13. A system in accordance with claim 12 wherein:

said circuit means operates while the scanning unit means scans through the predetermined range of scan angles to produce an output control voltage concurrent with the scan by the scanning unit means and having an amplitude decreasing from a first value to a second value as the scanning unit means scans through a first portion of the predetermined range of scan angles and then increasing from the second value back to the first value as the scanning unit means operates to scan through a second portion of the predetermined range of scan angles; and said variable-gain amplifier circuit means operates while the scanning unit means scans through the predetermined range of scan angles to decrease the value of its gain from a first value to a second value as the scanning unit means scans through the first portion of the predetermined range of scan angles and then to increase the value of its gain from the second value back to the first value as the scanning unit means operates to scan through the second portion of the predetermined range of scan angles.

14. A system in accordance with claim 13 wherein:

the first and second portions of the predetermined range of scan angles are first and second halves, respectively, of the predetermined range of scan angles, whereby output signals produced by the scanning unit means and representative of information encoded in labels located at varying positions in the scan paths of the scanning unit means are amplified by the variable-gain amplifier circuit means to produce amplified signals therefrom having an essentially uniform, constant amplitude.

15. A system in accordance with claim 12 wherein the circuit means comprises:

pulse generating circuit means coupled to the scanning unit means and operative at the outset of the operation of the scanning unit means to scan through the predetermined range of scan angles to produce an output pulse; and gain control circuit means operative to receive the output pulse produced by the pulse generating circuit means and in response thereto to produce an output control voltage having an amplitude varying over the duration of the scan by the scanning unit means.

* * * * *